(12) United States Patent
Vaidyanathan

(10) Patent No.: US 11,294,980 B2
(45) Date of Patent: Apr. 5, 2022

(54) WEB ADDRESS DETERMINATION BASED ON A GEO-POSITION OF A USER

(71) Applicant: PAYPAL, INC., San Jose, CA (US)

(72) Inventor: Sathish Vaidyanathan, Chennai (IN)

(73) Assignee: PAYPAL, INC., San Jose, CA (US)

( * ) Notice: Subject to any disclaimer, the term of this patent is extended or adjusted under 35 U.S.C. 154(b) by 49 days.

(21) Appl. No.: 16/134,818

(22) Filed: Sep. 18, 2018

(65) Prior Publication Data

US 2019/0213225 A1 Jul. 11, 2019

Related U.S. Application Data

(63) Continuation of application No. 14/586,722, filed on Dec. 30, 2014, now Pat. No. 10,078,700.

(60) Provisional application No. 61/725,876, filed on Jan. 10, 2014.

(51) Int. Cl.
*G06F 16/9537* (2019.01)
*H04W 4/029* (2018.01)
*H04W 4/02* (2018.01)
*G06Q 20/00* (2012.01)
*H04W 4/12* (2009.01)

(52) U.S. Cl.
CPC .......... *G06F 16/9537* (2019.01); *H04W 4/02* (2013.01); *H04W 4/029* (2018.02); *G06Q 20/00* (2013.01); *H04W 4/12* (2013.01)

(58) Field of Classification Search
CPC .. G06F 16/9537; G06F 16/953; H04W 4/029; H04W 4/025; H04W 4/02
See application file for complete search history.

(56) References Cited

U.S. PATENT DOCUMENTS

| | | | | |
|---|---|---|---|---|
| 5,930,699 A * | 7/1999 | Bhatia | ............. | H04W 4/029 |
| | | | | 455/456.3 |
| 6,199,079 B1 * | 3/2001 | Gupta | ............. | G06F 40/14 |
| | | | | 715/207 |
| 6,446,004 B1 * | 9/2002 | Cao | ............. | G06F 9/445 |
| | | | | 701/482 |
| 8,566,236 B2 * | 10/2013 | Busch | ............. | G06Q 30/0224 |
| | | | | 705/39 |
| 9,171,301 B1 * | 10/2015 | Gupta | ............. | G06Q 20/04 |
| 10,733,644 B2 * | 8/2020 | Tanaka | ............. | G06Q 30/0601 |
| 2001/0020235 A1 * | 9/2001 | Game | ............. | G06F 16/951 |
| 2006/0041663 A1 * | 2/2006 | Brown | ............. | G06F 16/9535 |
| | | | | 709/226 |

(Continued)

*Primary Examiner* — Esther B. Henderson
(74) *Attorney, Agent, or Firm* — Haynes and Boone, LLP

(57) ABSTRACT

There are provided systems and method for a web address determination based on a geo-position of a user. A user may utilize a communication device at a location of an entity to be redirected to an online contact address of the entity. A server may receive a request from the communication device including a request for an online contact address for an entity at the location of the user. The server may then access the location of the user by either receiving the location of the user from the communication device or determining the location of the user by the server. Once the location of the user is accessed, the server may determine the online contact address for the entity at the location of the user. The online contact address may be transmitted to the user for display by the communication device, including display of a website for the entity.

20 Claims, 5 Drawing Sheets

(56) References Cited

U.S. PATENT DOCUMENTS

| | | | | |
|---|---|---|---|---|
| 2006/0105789 A1* | 5/2006 | Amit | ........................ | H04L 67/02 |
| | | | | 455/456.6 |
| 2008/0070588 A1* | 3/2008 | Morin | .................... | H04W 4/027 |
| | | | | 455/456.1 |
| 2009/0163228 A1* | 6/2009 | Blumberg | ............... | G01C 21/20 |
| | | | | 455/456.3 |
| 2010/0082526 A1* | 4/2010 | Wassingbo | ............ | H04W 4/021 |
| | | | | 707/603 |
| 2011/0246910 A1* | 10/2011 | Moxley | .................. | G06Q 10/10 |
| | | | | 715/758 |
| 2011/0258127 A1* | 10/2011 | Graboske | ............... | G06Q 50/16 |
| | | | | 705/306 |
| 2012/0233158 A1* | 9/2012 | Braginsky | ................ | H04L 67/18 |
| | | | | 707/724 |
| 2013/0046691 A1* | 2/2013 | Culton | ................. | G06Q 20/407 |
| | | | | 705/44 |
| 2013/0311290 A1* | 11/2013 | Khwaja | .................. | G06Q 30/02 |
| | | | | 705/14.58 |
| 2014/0164280 A1* | 6/2014 | Stepanenko | .......... | H04W 4/029 |
| | | | | 705/341 |

* cited by examiner

WEB ADDRESS DETERMINATION BASED ON A GEO-POSITION OF A USER

CROSS-REFERENCE TO RELATED APPLICATIONS

This application is a continuation of U.S. patent application Ser. No. 14/586,722 filed Dec. 30, 2014 and entitled "WEB ADDRESS DETERMINATION BASED ON A GEO-POSITION OF A USER" (to issue as U.S. Pat. No. 10,078,700 on Sep. 18, 2018), which claims priority to and the benefit of U.S. Provisional Patent Application No. 61/925,876 filed Jan. 10, 2014 and entitled "SYSTEMS AND METHODS FOR WEB ADDRESS DETERMINATION BASED ON A GEO-POSITION OF A USER," the contents all of which are incorporated herein by reference in their entireties.

TECHNICAL FIELD

The present application generally relates to web address determination based on a geo-position of a user and more specifically to determining and transmitting an online address for an entity at location of a user in order for the user to view the online address on a communication device at the location.

BACKGROUND

Users may utilize communication devices at locations of entities in order to view information and/or complete transactions with the entities. For example, a museum, library, school building, etc. may offer a website where users can obtain information about the location, such as maps, historical information, and/or services offered to the user. Users may utilize a communication device at a merchant location to complete transactions with the merchant including paying for items. A payment provider may process the transactions in certain embodiments. Some users may wish to transmit an email to an administrator or other person at or associated with the location of the entity. However, without knowing the online web contact information of the entity, the users cannot utilize the website of the entity. Some entities may place online contact information for the entity on brochures or in places the users may see. Thus, the user is required to either perform an online search to find online information about the entity, or the user must find the information or request the information in person at the entity.

Figure 1:
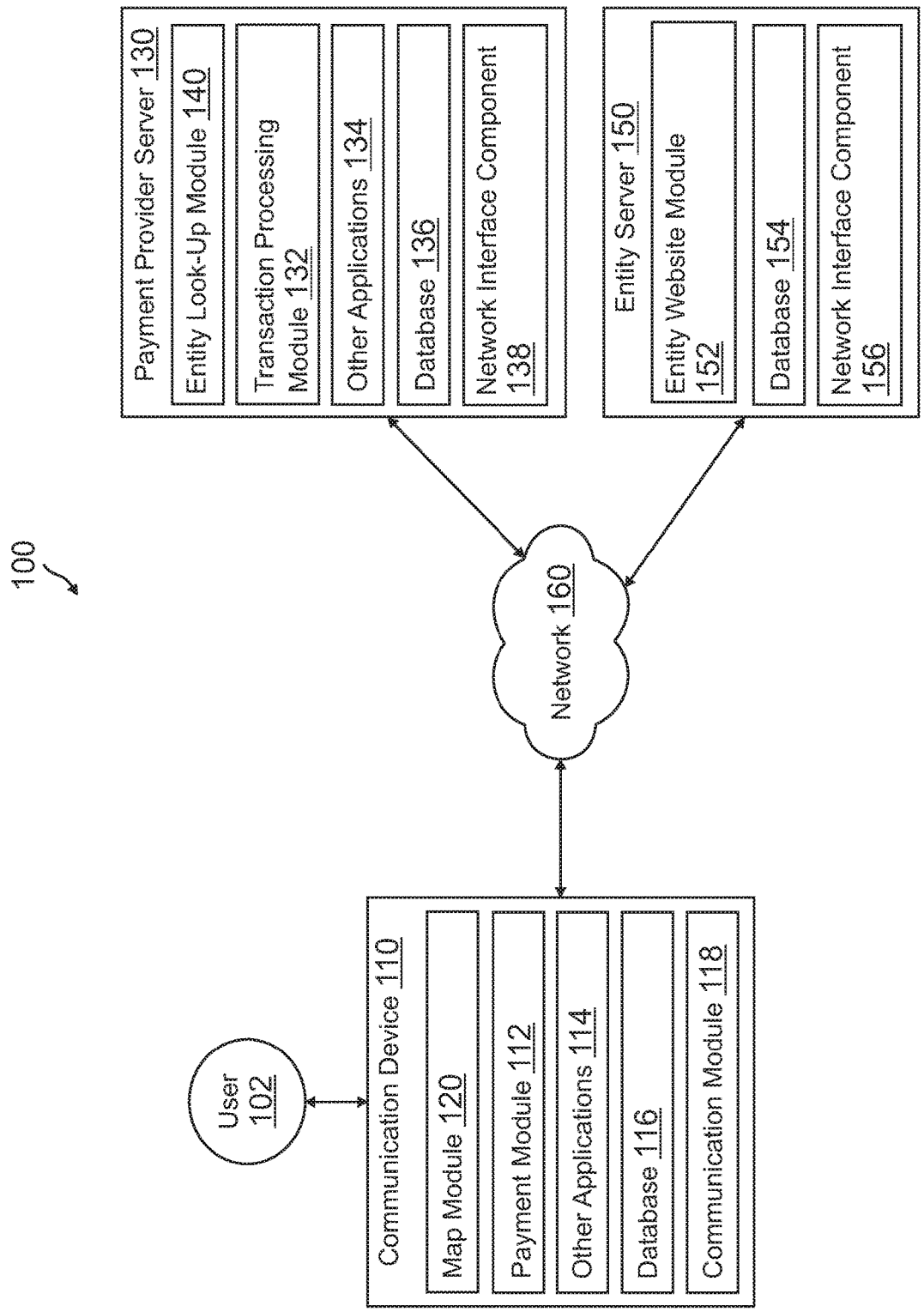
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods that provide for web address determination based on a geo-position of a user. Systems suitable for practicing methods of the present disclosure are also provided.

A user may utilize a communication device at a location of an entity to receive an online contact address for the entity at the location of the user. The entity may correspond to an institution at the location of the user, for example, a museum, school, library, hospital, or merchant storefront. However, the entity may also include landmarks at or nearby the user's location, transportation providers (e.g., a bus, train, taxi, etc.) at or near the user's location, or other users (e.g., nearby authorities, persons, etc.) at or near the user's location. The user may transmit a request for the online contact address of the entity using the communication device. The request may be transmitted by selecting an application or a feature of an application (e.g., a button to engage a process of the application), or the user may engage in some action (e.g., tilting or shaking the communication device, activating through a voice input, etc.) in order to transmit the request.

Once the request is transmitted to a server, the server may access the location of the user. In various embodiments, the location is accessed by receiving the location from the communication device, such as from a mapping application, GPS or other location module, and/or through a wireless connection (e.g., with the entity). In other embodiments, the location of the user may be determined by the server, for example, using the network connection of the communication device with a network provider (e.g., mobile phone identification, triangulation or other mobile phone tracking procedure), GPS resources of the server, and/or the entities available information.

Once the location of the user is accessed, the server may determine the online contact address for the entity. For example, the geo-position (e.g., GPS or other location coordinates of the user) may be utilized to determine the entity at or near the location of the user. Thus, the geo-position of the user may be correlated with a geo-position of the entity to associate the two. The online contact information for the entity may be determined through online resources, including looking up a website or IP address for the entity, determining an email address for the entity, and/or determining additional contact information about the entity (e.g., phone number, address, contact information for administrators/authorities at the entity, etc.). In various embodiments, the user may specify what online contact information the user would like to receive.

The online contact information may then be transmitted to the communication device. The communication device may display the online contact information, such as a URL address of a website or a home page of the website corresponding to the user location, to the user. The online contact information may be displayed without user input, such as automatically displaying a website of the entity received from the server or auto-populating an email form with the email address of the entity. Where the user selects the type of online contact information to receive, the online contact information may be automatically displayed consistent with the selected type. If more than one type of online contact information is requested, the user may see each, or may view a menu to select one or more to view. In certain embodiments where the entity is a merchant, a website or purchase form for the merchant may be displayed to the user. Thus, the user may generate a transaction (e.g., a purchase order from the merchant) from the displayed online contact information, and transmit the transaction for processing. The server may process and complete the transaction, including utilizing a payment account of the user with a payment provider to complete the transaction.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary device and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user 102, a communication device 110, a payment provider server 130, and an entity server 150 in communication over a network 160. User 102 may utilize communication device 110 to request at least one online contact address corresponding to an entity at a location of a user. An online contact address may correspond to a website for the entity, an email address for the entity, an IP address for the entity, or other available online information for the entity. Payment provider server 130 may receive the request over network 160 and access the location of the user using communication device 110. Once the location of the user is accessed, payment provider server 130 may determine the at least one online contact address using information available for entity server 150. Payment provider server 130 may then transmit the at least one online contact address to communication device 110 for display to user 102.

Communication device 110, payment provider server 130, and entity server 150 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

Communication device 110 may be implemented using any appropriate hardware and software configured for wired and/or wireless communication with payment provider server 130 and/or entity server 150. For example, in one embodiment, communication device 110 may be implemented as a personal computer (PC), a smart phone, laptop computer, wristwatch with appropriate computer hardware resources, eyeglasses with appropriate computer hardware (e.g. GOOGLE GLASS®) and/or other types of computing devices capable of transmitting and/or receiving data, such as an IPAD® from APPLE®. Although a communication device is shown, the communication device may be managed or controlled by any suitable processing device. Although only one communication device is shown, a plurality of communication devices may be utilized.

Communication device 110 of FIG. 1 contains a map module 120, a payment module 112, other applications 114, a database 116, and a communication module 118. Map module 120, payment module 112, and other applications 114 may correspond to processes, procedures, and/or applications, for example, a software program, executable by a hardware processor. In other embodiments, communication device 110 may include additional or different modules having specialized hardware and/or software as required.

Map module 120 may correspond to one or more processes to execute modules and associated specialized hardware of communication device 110 to determine a location of user 102, transmit requests for online contact information/addresses for an entity at or near a location of user 102 (e.g., an entity corresponding to entity server 150), and/or receive the online contact information/addresses for the entity. In this regard, map module 120 may correspond to specialized hardware and/or software that may provide an interface permitting user 102 to view a map local to and/or including user 102. Thus, map module 120 may utilize a location determining module/device of communication device 110 to determine a location of user 102. In other embodiments, map module 120 may request a location of user 102 through other means, such as mobile device locating services, a wireless connection of communication device 110, and/or other location resources. Map module 120 may further include processes and procedures to request online contact addresses for the entity at the location of the user. Thus, map module 120 may include a feature to initiate a process (e.g., a button, action, and/or other input to initiate the process) to transmit a request for the online contact address to a server, such as payment provider server 130. Map module 120 may transmit the request after user 102 selects the feature. In other embodiments, the request may be transmitted when user 102 arrives at the location or is located at the location for a period of time. Once the request is transmitted, payment provider server 130 may determine the online contact information, as explained herein.

Once map module 120 receives the online contact information, map module 120 may display the online contact information to user 102. However, in other embodiments, another application on communication device 110 may display the online contact information, including an email application, a browser application, a media player application, and/or other application (e.g., an application in other applications 114). For example, map module 120 and/or a browser application may navigate to the website corresponding to the entity at or near user 102 and an email, text, or other communication form may be populated with the online contact information in map module 120, an email application, and/or a MMS/SMS application, etc. The online contact information may be displayed in map module 120 and/or the other application without user input.

Once user 102 receives the online contact information through communication device 110, user 102 may engage in other online transactions/communications using the online contact information. For example, user 102 may transmit an email, text, phone call, or other communication with the entity and/or entity server 150. Where communication device 110 receives a website for entity server 150, user 102 may engage in transactions with the website, such as purchases of products. The transactions may be generated through map module 120 and/or a browser application displaying the website of entity server 150. Additionally, payment module 112 may be utilized to complete the transactions with entity server 150 using, in various embodiments, payment provider server 130.

Map module 120 may further include specialized hardware and/or software utilized to determine a location for user 102, such as a GPS, navigation system, or other location determining modules. In various embodiments, map module 120 may include wireless modules to connect to and determine a location of communication device 110. Map module 120 may be utilized by communication device 110 to determine a location of communication device 110 and, thus, user 102 during normal course of operation (e.g., when utilizing a mapping application of communication device 110 to view a location for user 102 and/or map travel routes) and/or when requesting online information for an entity at or nearby the location of user 102. Map module 120 may also be accessed by payment provider server 130 and/or another device or server to determine and/or retrieve a location of user 102, for example, when responding to a request for the online information of the entity at or nearby the location of user 102. The location of user 102 may correspond to coordinates determined by map module 120, an address retrieved using map module 120, and/or a name/identification of a nearby landmark or entity retrieved by map module 120.

Payment module 112 may correspond to one or more processes to execute modules and associated specialized hardware of communication device 110 to provide a convenient interface to permit user 102 to select payment options and provide payment for items and/or services. In this regard, connection module 112 may correspond to specialized hardware and/or software to provide a user interface enabling the user to enter payment options for storage by communication device 110, provide payment options on checkout/payment of an item/service, and complete a transaction for the item/service. In certain embodiments, payment module 112 may correspond more generally to a web browser configured to view information available over the Internet or access a website corresponding to a payment service. Payment module 112 may utilize user financial information, such as a credit card, bank account, or other financial account. Additionally, payment module 112 may provide payment for items using a user account with payment provider, such as payment provider server 130.

If user 102 receives a website for a merchant including products/services and purchase options from map module 120, communication device 110 may generate a transactions using payment provider server 130 and/or entity server 150. Thus, payment module 112 may populate and/or transmit payment information for the transaction. For example, payment module 112 may populate a transaction form for entity server 150 using information received from map module 120 (e.g., an email address of an entity and/or an online website for the entity), transmit selected payment information to payment provider server 130 and/or entity server 150, and/ generate a payment token from the transaction and/or selected payment information. Thus, payment module 112 may be used to generate a payment token and/or to complete a transaction.

In various embodiments, one or more features of map module 120 and/or payment module 112 may be incorporated in the same module so as to provide their respective features in one module.

Communication device 110 includes other applications 114 as may be desired in particular embodiments to provide features to communication device 110. For example, other applications 114 may include security applications for implementing client-side security features, programmatic client applications for interfacing with appropriate application programming interfaces (APIs) over network 160, or other types of applications. Other applications 114 may also include email, texting, voice and IM applications that allow a user to send and receive emails, calls, texts, and other notifications through network 160. In various embodiments, other applications 114 may include financial applications, such as banking, online payments, money transfer, or other applications associated with payment provider server 130. Where not provided by map module 120 and/or payment module 112, other applications may include browser applications and/or payment applications. Other applications 114 may contain software programs, executable by a processor, including a graphical user interface (GUI) configured to provide an interface to the user.

Communication device 110 may further include database 116 which may include, for example, identifiers such as operating system registry entries, cookies associated with map module 120, payment module 112, and/or other applications 114, identifiers associated with hardware of communication device 110, or other appropriate identifiers, such as identifiers used for payment/user/device authentication or identification. In one embodiment, identifiers in database 116 may be used by a payment/credit provider, such as payment provider server 130, to associate communication device 110 with a particular account maintained by the payment/credit provider. Database 116 may further include payment card information, including credit, debit, and/or gift card information. In various embodiments, database 116 may include online account access information. Database 116 may also store location information for user 102, include GPS or other location coordinates received from location modules 115. Additionally, database 116 may store received information, such as online contact address information for an entity at a location of user 102, such as online contact information for entity server 150.

Communication device 110 includes at least one communication module 118 adapted to communicate with payment provider server 130 and/or entity server 150 over network 160. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Payment provider server 130 may be maintained, for example, by an online payment service provider, which may provide payment services and/or processing for financial transactions on behalf of a user with a merchant. In this regard, payment provider server 130 includes one or more processing applications which may be configured to interact with communication device 110 and/or entity server 150 to facilitate payment for a transaction. In one example, payment provider server 130 may be provided by PAYPAL®, Inc. of San Jose, Calif., USA. However, in other embodiments, payment provider server 130 may be maintained by or include a credit provider, financial services provider, financial data provider, and/or other service provider, which may provide payment services to user 102.

Payment provider server 130 of FIG. 1 includes an entity look-up module 140, a transaction processing module 132, other applications 134, a database 136, and a network interface component 138. Entity look-up module 140, transaction processing module 132, and other applications 134 may correspond to processes, procedures, and/or applications, for example, a software program, executable by a hardware processor. In other embodiments, payment provider server 130 may include additional or different modules having specialized hardware and/or software as required.

Entity look-up module 140 may correspond to one or more processes to execute modules and associated specialized hardware of entity look-up module 140 to receive a request for online contact information/address for an entity at a location of a user and determine the online contact information/address using a location for the user, a location for the entity, and/or available online contact information/address for the entity. In this regard, entity look-up module 140 may correspond to specialized hardware and/or software to access the request for the online contact address corresponding to the entity at a location of user 102 received using network interface component 138. The request may be for one or a plurality of online contact addresses, such as an email address, a website address, an IP address, etc. The entity may be an entity corresponding to entity server 150. The entity may be a landmark (e.g., building, location, etc.), may be a service offered at a location (e.g., library, museum, educational, administrative, hotel, transportation, etc. services), or may be other users near user 102.

Once accessed, entity look-up module 140 may require the location of user 102 in order to determine one or more entities at or nearby the location of user 102. Entity look-up module may access the location of user 102 from received information communicated to network interface component 138 by map module 120 of communication device 110. For example, the location may be accessed by receiving a location, such as GPS coordinates, from communication device 110. In other embodiments, payment provider server 130 may request and/or access map module 120 and/or database 116 of communication device 110 to retrieve a location of user 102 (e.g., latitude/longitude coordinates, GPS coordinates, a connected device identifier, a check-in at a location, or other location information). Additionally, entity look-up module 140 may determine the location of user 102 using another server and/or service, such as a GPS service of payment provider server 130 and/or another server, a wireless connection with a wireless provider (e.g., through mobile phone location services), or through a location corresponding to a connection between communication device 110 and a wireless provider (e.g., a location of a mobile network provider connected to communication device 110, a short range wireless Internet connection, etc.).

Once entity look-up module 140 has accessed a location of user 102, entity look-up application may determine the online contact information/address for the entity at the location of user 102. Entity look-up module 140 may use the location coordinates, the address, or the wireless connection address (e.g., IP address) for the location of user 102 to perform a search utilizing a search engine, database, and/or other search process, to determine the entity at or nearby the location of user 102. Once one or more entities at or nearby the location for user 102 is determined, an online contact address for the entity may be determined using similar search procedures. Thus, entity look-up module 140 may determine an entity corresponding to entity server 150 is at the location of user 102 through available resources over network 160 and/or through database 136, in various embodiments. Where the entity corresponds to entity server 150, once entity look-up module 140 has determined entity server 150 corresponds to the location of user 102, entity look-up module 140 may determine an online contact information/address for entity server 150, such as a website address, email address, and/or IP address.

Entity look-up module 140 may transmit the online contact address to communication device 110 for display to user 102. User 102 may then interact with the online contact address by, for example, emailing, interacting with a website, etc. Entity look-up module 140 may receive interactions, such as purchase requests for transactions generated by communication device 110 with the website, email address, IP address, etc. The transactions may be processed using transaction processing module 132.

Transaction processing module 132 may correspond to one or more processes to execute modules and associated specialized hardware of transaction processing module 152 to receive and/or transmit information from communication device 110, merchant device 140, and/or payment card issuer server 160 for processing and completion of financial transactions. In this regard, transaction processing module 152 may correspond to specialized hardware and/or software to process financial transaction information from communication device 110 and entity server 150 by receiving a payment token from communication device 110 and/or entity server 150 for completion of a transaction with entity server 150. The payment token may correspond to a payment request from user 102 to entity server 150. The payment token may be encrypted prior to transmission to transaction processing module 132. The payment token may include information corresponding to user identifiers, user financial information/identifiers, transaction information and/or identifiers, and/or entity server 150 identifiers. Additionally, the payment token may include a payment request having payment amount and terms of payment for the transaction. Once received, transaction processing module 132 may utilize a payment account or financial information (e.g., a payment instrument such as a credit/debit card, bank account, etc.) of the paying user to render payment for the sale offer. Payment may be made to entity server 150 using the payment account or other payment instrument and the terms of the payment request. Additionally, transaction processing module 132 may provide transaction histories, including receipts, to communication device 110 and/or entity server for completion and documentation of the financial transaction.

In various embodiments, payment provider server 130 includes other applications 134 as may be desired in particular embodiments to provide features to payment provider server 130. For example, other applications 134 may include security applications for implementing server-side security features, programmatic server applications for interfacing with appropriate application programming interfaces (APIs) over network 160, or other types of applications. Other applications 134 may contain software programs, executable by a processor, including a graphical user interface (GUI), configured to provide an interface to a user.

Additionally, payment provider server 130 includes database 136. As previously discussed, user 102 may establish one or more user accounts with payment provider server 130. Database 136 may include user accounts having user information, such as name, address, birthdate, payment/funding information, additional user financial information, and/or other desired user data. User 102 may link a user account in database 136 to communication device 110 through a user identifier, communication device identifier, and/or user account identifier. Thus, when an appropriate identifier is transmitted to payment provider server 130, e.g. from communication device 110 and/or entity server 150, a user account belonging to user 102 may be found. However, in other embodiments, user 102 may not have previously established a user account. Thus, payment provider server 130 may complete a transaction based on other user financial information received from communication device 110 and/or payment provider server 130. Database 136 may further store information used by entity look-up module 140, such as received requests for online contact information/address of an entity at a location of user 102. Database 136 may include location information for user 102, as well as location information for one or more entities and online contact information/addresses for the entities.

In various embodiments, payment provider server 130 includes at least one network interface component 138 adapted to communicate with network 160 including communication device 110 and/or entity server 150. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Entity server 150 may be maintained, for example, by an entity including a landmark, service provider or seller offering various items, products, and/or services, and/or a server corresponding to a user or group of users. Generally, entity server 150 may be maintained by anyone or any entity. In this regard, entity server 150 may include processing applications, which may be configured to interact with communication device 110 and/or payment provider server 130 to retain online contact information/addresses for an entity at a location of user 102.

Entity server 150 may be implemented using any appropriate hardware and software configured for wired and/or wireless communication with communication device 110 and/or payment provider server 130. In various embodiments, entity server 150 may correspond to a device local to or associated with the entity, such as a device at or nearby a merchant (or other) location, a server for the merchant (or other) location, or other device/server for the merchant (or other) location. In such embodiments, entity server 150 may be implemented as a personal computer (PC), a smart phone, laptop computer, wristwatch with appropriate computer hardware resources, eyeglasses with appropriate computer hardware (e.g. GOOGLE GLASS®) and/or other types of computing devices capable of transmitting and/or receiving data, such as an IPAD® from APPLE®. Although an entity server is shown, the entity server may be managed or controlled by any suitable processing device. Although only one entity server is shown, a plurality of entity servers may function similarly.

Entity server 150 includes an entity website module 152, a database 154, and a network interface component 156. Entity website module 152 may correspond to processes, procedures, and/or applications, for example, a software program, executable by a hardware processor. In other embodiments, entity server 150 may include additional or different modules having specialized hardware and/or software as required Entity website module 152 may correspond to one or more processes to execute modules and associated specialized hardware of entity website module 152 to host and/or offer a website retrievable by communication device 110 and/or payment provider server 130. In this regard, entity website module 152 may correspond to specialized hardware and/or software that include information, processes, and procedures to display information over network 160 to user 102 for an entity, such as website, an email address, an IP address, or other online contact information. Additionally, entity website module 152 may further provide offline information for the entity, such as available items/services for the entity, an address for the entity, hours of operation for the entity, a map of the entity's location, or other available offline information, including offline contact information (e.g., a phone number, the address, etc.). Entity website module 152 may include a website of an entity, such as a merchant, educational institution, service provider, etc. website. In other embodiments, entity website module 152 may host a website for contact with a user at the location of user 102, such as an email, text, VoIP, etc. website. Entity website module 152 may include an online contact address/information for the entity at the location of user 102, including a website address, an email address, an IP address, etc.

Entity server 150 includes database 154, which may include, for example, identifiers such as operating system registry entries, identifiers and/or cookies associated with entity website application 132, identifiers associated with hardware of entity server 150, or other appropriate identifiers, such as identifiers used for payment/user/device authentication or identification. In one embodiment, identifiers in database 154 may include online and/or offline contact addresses and other information for one or more entities corresponding to entity server 150 and at or nearby the location of user 102. Database 154 may also store location information for the entities at the location of user 102, include GPS or other location coordinates.

In various embodiments, entity server 150 includes at least one network interface component 156 adapted to communicate with network 160 including communication device 110 and/or payment provider server 130. In various embodiments, network interface component 156 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 100.

Figure 2:
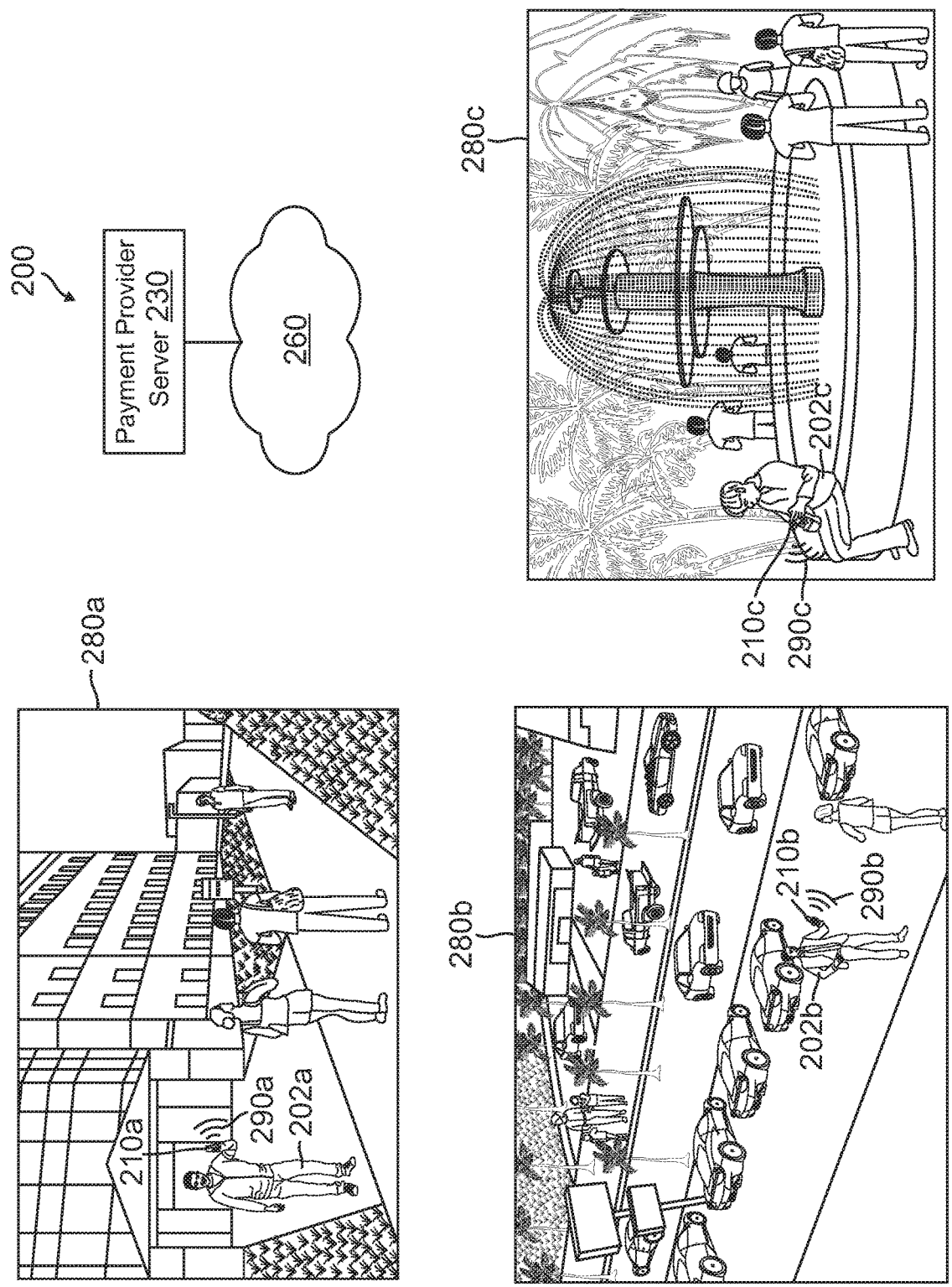
FIG. 2 is an exemplary environment where web addresses of entities at locations of users are determined using the users' geo-positions, according to an embodiment.

FIG. 2 is an exemplary environment where web addresses of entities at locations of users are determined using the users' geo-positions, according to an embodiment. Environment 200 includes a user 202*a* in possession of a communication device 210*a*, a user 202*b* in possession of a communication device 210*b*, and a user 202*c* in possession of a communication device 210*c* all corresponding to user 102 and communication device 110, respectively, of FIG. 1. Additionally, environment 200 includes a payment provider server 230 and a network 260 corresponding generally to payment provider server 130 and network 160, respectively, of FIG. 1.

As shown in environment 200, user 202a is located at a location 280a, which may correspond to a school building or campus. Thus, location 280a may include an associated entity, such as the school/business owning location 280a. While at location 280a, user 202a may wish to receive information about the entity at location 280a. Such information may correspond to online and/or offline contact information for the entity. For example, user 202a may wish to email the entity associated with location 280a, view a website of the entity, and/or complete a transaction with the entity. In order to receive online and/or offline contact information for the entity, communication device 210a in possession of user 202a communicates a request 290a over network 260 to payment provider server 230. The request may be associated with a request for the online/offline contact information for the entity associated with location 280a. Additionally, the request may include location information for user 202a in certain embodiments. For example, communication device 210a may utilize a map module (e.g., a GPS module or mapping application) to determine the location of user 202a. Once payment provider server 230 receives the request and location information for user 202a, payment provider server may determine the entity associated with location 280a and provide online contact information for the entity to communication device 210a. Thus, user 202a may view a website or email address associated with the school/business owning location 280a.

Similarly, users 202b and 202c may receive entity information about entities at locations 280b and 280c, respectively. For example, user 202b may be approaching user 202b's vehicle in a parking location (e.g., location 280b). User 202b may be required to pay for parking at location 280b. In order to complete a transaction for parking at location 280b, user 202b may require an online website, form, or email address for the entity associated with location 280b (e.g., a parking service management for location 280b). User 202b may utilize communication device 210b to transmit a request 290b over network 260 to payment provider server 230 in order to receive the parking service management entity for location 280b using the location for user 202b. Furthermore, user 202c may be travelling through a park and be located at a location 280c, such as a fountain. Since user 202c may be unaware of the layout of the park, user 202c may wish to view an online map or access offline information for the park, such as a phone number of a park service. In similar fashion, user 202c may utilize communication device 210c to transmit a request 290c to receive the entity for the location of user 202c. Thus, user 202c may receive entity information for location 280c using communication device 210c.

Figure 3:
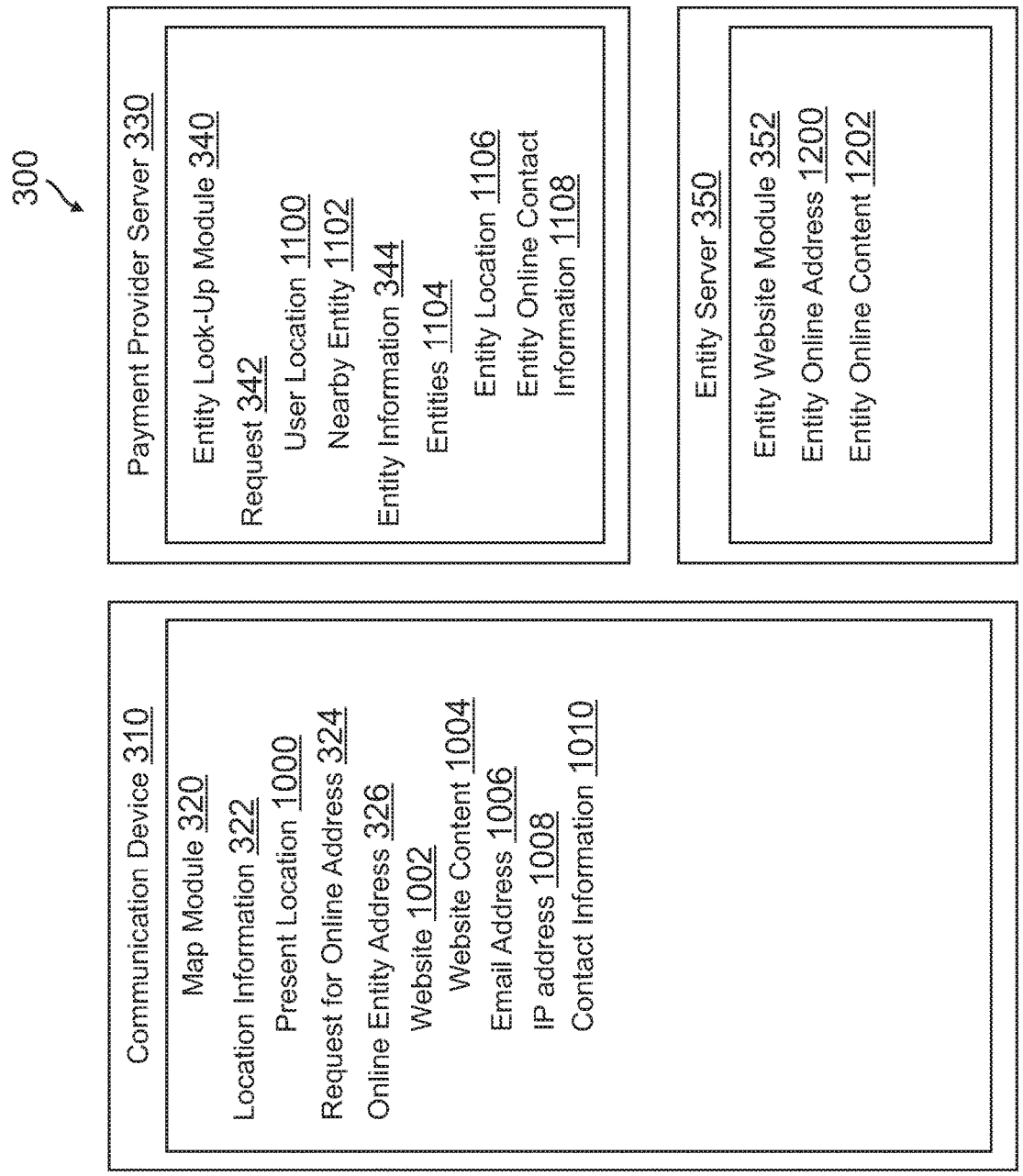
FIG. 3 is a system environment having a communication device providing a request for a web address of an entity at a location of a user to a payment provider server for determination of the web address using the geo-position of the user, according to an embodiment.

FIG. 3 is a system environment having a communication device providing a request for a web address of an entity at a location of a user to a payment provider server for determination of the web address using the geo-position of the user, according to an embodiment. Environment 300 of FIG. 3 includes a communication device 310, a payment provider server 330, and an entity server 350 corresponding generally to communication device 110, payment provider server 330, and entity server 350, respectively, of FIG. 1.

Communication device 310 executes a map module 320 corresponding generally to the specialized hardware and/or software modules and processes described in reference to map module 120 of FIG. 1. In this regard, map module 320 may be utilized to communicate a request for online entity contact information and/or address(es) for an entity located at or nearby a user (not shown) associated with communication device 310. Thus, map module 320 includes location information 322, a request for online address 324, and an online entity address 326. Location information 322 may include present location 1000 that may be utilized to determine a location for the user, and thus find one or more entities located at or nearby present location 1000 of the user. Request for online address 324 may correspond to a process/procedure to communicate the request for online contact information for the entity at or nearby location 1000. Request for online address 324 may correspond to a process initiated by the user on selection in a user interface, or may include an option to communicate the request without user input, such as in the background of the operating system of communication device 310. After receiving online contact information and/or an address for the entity, map module include online entity address 326 having one or more of web site 1002 for the entity, which may include website content 1004 (e.g., one or more displayable webpages), an email address 1006, an IP address 1008, and contact information 1010 (e.g., offline contact information, such as a phone number, address, payment account, etc.).

Payment provider server 330 executes a entity look-up module 340 corresponding generally to the specialized hardware and/or software modules and processes described in reference to entity look-up module 140 of FIG. 1. In this regard, entity look-up module 340 may be utilized to determine an entity at or nearby the location of the user associated with communication device 110, such as the location in present location 1000. Thus, entity look-up module 340 includes a request 342 and entity information 344. Request 342 may be receive from communication device 310 when request for online address 324 is initiated. Request 342 includes a user location 1100 and nearby entity 1102. User location 1100 may include a physical location of the user, and may be received/accessed/determined using present location 1000. Using user location 1100, nearby entity 1102 may be determined. For example, the coordinates in user location 1100 may be matched to coordinates for the entity in nearby entity 1102. In other embodiments, an address in user location 1100 may be matched to the entity in nearby entity 1102. Thus, entity look-up module 340 may utilize entity information 344 to determine the entity associated with user location 1100. Entity information 344 includes entities 1104, which may have associated entity location 1106 and entity online contact information 1108.

In order to determine entity information 344, entity look-up module 340 may access information available from entity server 350. Thus, entity server 350 executes a entity website module 352 corresponding generally to the specialized hardware and/or software modules and processes described in reference to entity website module 352 of FIG. 1. Entity website module 352 may provide accessible information to entity look-up module 340. In this regard, entity website module 352 includes entity online address 1200 and entity online content 1202. Entity online address 1200 may include online entity contact information, which may be provided to map module 320 by entity look-up module 340. Entity online content 1202 may include content that may be provided to map module 320, which may also include offline contact information for the entity (e.g., an address, phone number, etc.).

Figure 4:
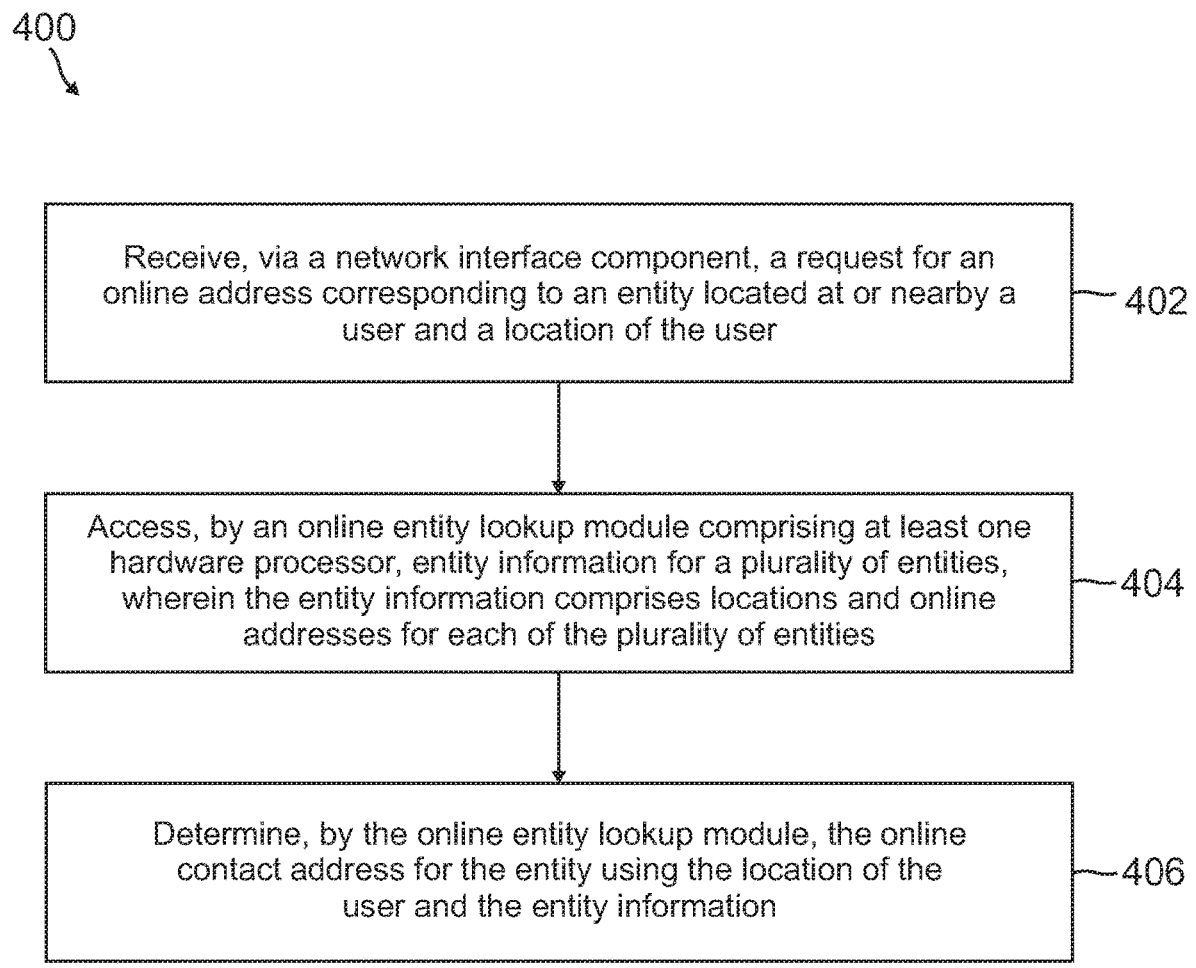
FIG. 4 is a flowchart of an exemplary process for web address determination based on a geo-position of a user, according to an embodiment.

FIG. 4 is a flowchart of an exemplary process for web address determination based on a geo-position of a user, according to an embodiment. Note that one or more steps, processes, and methods described herein may be omitted, performed in a different sequence, or combined as desired or appropriate.

At step 402, a request for an online address corresponding to an entity located at or nearby a user and a location of the user is received via a network interface component. The entity may correspond to an institution at the location of the user, for example, a museum, school, library, hospital, or merchant storefront. However, the entity may also include landmarks at or nearby the user's location, transportation providers (e.g., a bus, train, taxi, etc.) at or near the user's location, or other users (such as nearby authorities, persons, etc.) at or near the user's location. Moreover, the at least one online contact address may comprise at least one of a website address, an email address, and an IP address. A user may choose which address(es) to receive or the address(es) may be selected based on available information.

Entity information for a plurality of entities is accessed, by an online entity lookup module comprising at least one hardware processor, wherein the entity information comprises locations and online addresses for each of the plurality of entities, at step 404. The location of the user may be accessed by receiving the location of the user from a communication device of the user. Thus, the communication device may determine the location of the user using at least one of a wireless connection with the entity, a GPS module, and a map application. However, in other embodiments, the location of the user may be accessed by determining the location of the user using at least one of a wireless connection with the entity or other service provider, a GPS service, and a map application.

At step 406, the online contact address for the entity is determined, by the online entity lookup module, using the location of the user and the entity information. The at least one online contact address may be determined by retrieving the at least one online contact address from a website or IP address of the entity. Additionally, once the at least one online contact address is determined, the at least one online contact address may be transmitted a communication device of the user for display to the user. The communication device may display the at least one online contact address without further user input.

A server may further determine contact information (e.g., phone number, address, etc.) for the entity and transmit the contact information to the communication device for display to the user. In certain embodiments, the entity may correspond to a merchant and the at least one contact address a website address for the merchant that is displayed to the user. Thus, the server may process a transaction with the merchant using, in various embodiments, a payment provider.

Figure 5:
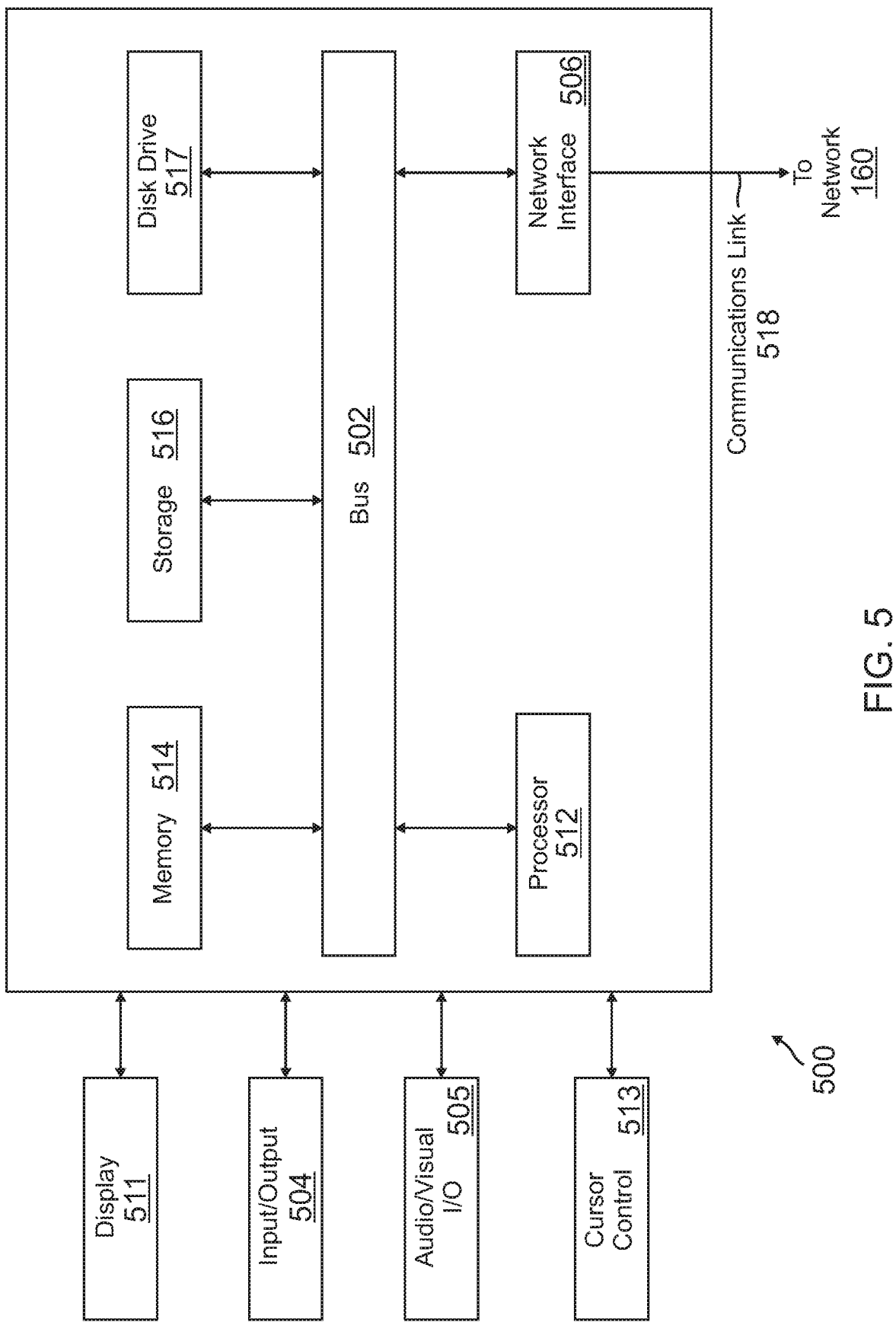
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 160. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
   a non-transitory memory; and
   one or more hardware processors in communication with the non-transitory memory and configured to read instructions from the non-transitory memory to cause the system to perform operations comprising:
      receiving, from a first application of a mobile device of a user, a request for contact information corresponding to a first type of entity, wherein the request is activated via a voice input;
      determining a location of the user;
      accessing information associated with the location;
      determining entities based on the location of the user and the information;
      determining the contact information for at least one of the entities associated with the location of the user, wherein the contact information comprises a network address of the at least one of the entities, and wherein the determining the contact information further includes determining that the at least one of the entities is the first type of entity, and wherein the contact information is associated with a transaction data form for the at least one of the entities and the location;
      communicating data comprising the contact information of the at least one of the entities to the mobile device, wherein the contact information is capable of facilitating an interaction over a network between the mobile device and the at least one of the entities at the network address via a second application of the mobile device;
      causing to be displayed, via a user interface of the second application of the mobile device based on the data, a plurality of interface fields for the transaction data form associated with processing the interaction over the network with the at least one of the entities;
      generating form data for at least one of the plurality of interface fields of the transaction data form based on the at least one of the entities associated with the location of the user;
      populating, without requiring user input to the mobile device for the user interface, a portion of the plurality of interface fields of the transaction data form in the second application with the contact information for the at least one of the entities and the generated form data; and
      receiving a completed data form from the mobile device based on data from the plurality of interface fields of the user interface, the at least one of the entities, and the location, wherein the data comprises a payment token associated with an account of the user, and wherein the completed data form includes payment information that is populated by a payment module of the mobile device.

2. The system of claim 1, wherein the operations further comprise:
   determining that the contact information is a first type of contact information; and
   determining that the contact information comprises first information of the first type of contact information and second information of a second type of contact information, wherein the determining the contact information comprises selecting the first information.

3. The system of claim 2, wherein the second type of contact information includes offline information that is capable of facilitating the interaction between the mobile device and the at least one of the entities independent of the network address.

4. The system of claim 1, wherein the contact information comprises a phone number of the at least one of the entities, and wherein the second application is a voice application configured to receive an audible input that indicates, at least in part, the network address.

5. The system of claim 1, wherein the second application is a web browser application configured to navigate over the network to the network address that corresponds to a website associated with the at least one of the entities for facilitating the interaction between the mobile device and the website.

6. The system of claim 1, wherein the first application is a map module on the mobile device.

7. A method comprising:
   receiving, from a mobile device of a user, a voice input request for contact information corresponding to a first type of entity located within a proximity to the user;
   determining that the voice input request originated from a map module on the mobile device;
   determining a location of the mobile device;
   accessing information associated with the location;
   determining an entity that is the first type of entity associated with the location based on the information;
   determining the contact information for the entity, wherein the contact information comprises a network address of the entity, and wherein the contact information is associated with a transaction form for the entity and the location;
   communicating data comprising the contact information of the entity to the mobile device, wherein the data is configured to cause the contact information to be displayed, after the mobile device receives the data and independent of user input, via the map module on the mobile device, and wherein the contact information is capable of facilitating an interaction over a network between the mobile device and the entity at the network address via a browser application of the mobile device;

causing to be displayed, via a user interface of the browser application of the mobile device based on the data, the transaction form comprising a plurality of fields associated with processing the interaction over the network with the entity;

generating form data for at least one of the plurality of fields of the transaction form based on the entity associated with the location of the user;

populating, without requiring user input to the mobile device for the transaction form, a portion of the plurality of fields of the transaction form in the browser application with the contact information for the entity and the generated form data; and receiving a completed transaction form associated with the entity and the location from the mobile device, wherein the completed transaction form comprises a payment token associated with an account of the user.

8. The method of claim 7, wherein the determining the entity based on the location comprises determining an institution, a landmark, a transportation provider, and/or an authority based on the location, and wherein the determining the contact information for the entity comprises accessing the contact information associated with the institution, the landmark, the transportation provider, and/or the authority.

9. The method of claim 7, further comprising:
determining a user preference for the voice input request, wherein the user preference indicates which of a type of entity the user prefers to receive contact information for, and wherein the accessing the contact information is based on the user preference.

10. The method of claim 7, wherein the receiving the voice input request comprises:
receiving the voice input request from the mobile device at a time after at which the mobile device exceeded a predetermined period of time being located at the location of the mobile device.

11. The method of claim 7, wherein the determining the location of the mobile device comprises determining an address associated with the mobile device, and wherein the entity matches the address.

12. The method of claim 7, wherein the determining the location of the mobile device comprises determining an address associated with the mobile device based on the voice input request, and wherein the location of the mobile device is based on the address.

13. The method of claim 7, wherein the voice input request comprises a network address associated with the mobile device, and wherein the location of the mobile device is based on the network address.

14. A non-transitory machine-readable medium having stored thereon machine-readable instructions executable to cause a machine to perform operations comprising:
receiving, via a mobile device of a user, a voice input request for contact information corresponding to a first type of entity;
determining a location of the mobile device;
communicating the location and the voice input request for the contact information to a server device;
receiving, from the server device, data comprising the contact information for at least one entity based on the location, wherein the contact information comprises a network address of the at least one entity, wherein the contact information is capable of facilitating an interaction over a network between the mobile device and the at least one entity at the network address via a browser application of the mobile device, and wherein the at least one entity is the first type of entity, and wherein the contact information is associated with a transaction form for the at least one entity and the location;

displaying, based on the receiving the data and without user input, the contact information for the at least one entity on a display of the mobile device;

displaying, via a user interface of the browser application of the mobile device based on the data, the transaction form comprising a plurality of fields associated with processing the interaction over the network with the at least one entity;

generating form data for at least one of the plurality of fields of the transaction form based on the at least one entity associated with the location of the user;

populating, without requiring the user input to the mobile device for the transaction form, a portion of the plurality of fields of the transaction form in the browser application with the contact information for the at least one entity and the generated form data; and determining a completed transaction form based on the user input, a payment token associated with an account of the user, the at least one entity, and the location.

15. The non-transitory machine-readable medium of claim 14, wherein the operations further comprise:
determining a preference of the user; and
determining a type of the contact information for the at least one entity based on the preference.

16. The non-transitory machine-readable medium of claim 14, wherein the data comprises contact information for a plurality of entities, and wherein the operations further comprise:
determining which of the contact information for the plurality of entities to display, wherein the displaying the contact information comprises displaying corresponding contact information based on determining which of the contact information for the plurality of entities to display.

17. The non-transitory machine-readable medium of claim 16, wherein the determining which of the contact information for the plurality of entities to display is based on at least one pre-determined user preference stored on the mobile device.

18. The non-transitory machine-readable medium of claim 14, wherein the contact information includes offline information that is capable of facilitating the interaction between the mobile device and the at least one entity independent of the network address.

19. The non-transitory machine-readable medium of claim 14, wherein the operations further comprise:
transmitting, to the server device, the transaction form for generating a transaction associated with the at least one entity.

20. The method of claim 7, wherein the transaction form comprises one of a plurality of transaction forms, and wherein the causing to be displayed the transaction form comprises:
causing the plurality of transaction forms to be displayed with a selectable option to choose each of the plurality of transaction forms for the interaction with the entity.

* * * * *

UNITED STATES PATENT AND TRADEMARK OFFICE
CERTIFICATE OF CORRECTION

PATENT NO. : 11,294,980 B2
APPLICATION NO. : 16/134818
DATED : April 5, 2022
INVENTOR(S) : Sathish Vaidyanathan It is certified that error appears in the above-identified patent and that said Letters Patent is hereby corrected as shown below:

On the Title Page

Under Related U.S. Application Data heading, item (60), change "Provisional application No. 61/725,876, filed on Jan. 10, 2014." to --Provisional application No. 61/925,876, filed on Jan. 10, 2014.--

Signed and Sealed this
Twenty-first Day of June, 2022

Katherine Kelly Vidal
*Director of the United States Patent and Trademark Office*